United States Patent
Neuhoff et al.

(10) Patent No.: US 10,351,101 B2
(45) Date of Patent: Jul. 16, 2019

(54) VEHICLE DOOR HANDLE WITH ANTENNA ARRANGEMENT

(71) Applicants: Stefan Neuhoff, Essen (DE); Mirko Schindler, Velbert (DE)

(72) Inventors: Stefan Neuhoff, Essen (DE); Mirko Schindler, Velbert (DE)

(73) Assignee: Huf Huelsbeck & Fuerst GmbH & Co. KG, Velbert (DE)

(*) Notice: Subject to any disclaimer, the term of this patent is extended or adjusted under 35 U.S.C. 154(b) by 0 days.

(21) Appl. No.: 15/910,541

(22) Filed: Mar. 2, 2018

(65) Prior Publication Data

US 2018/0312137 A1 Nov. 1, 2018

(30) Foreign Application Priority Data

Apr. 28, 2017 (DE) .......................... 10 2017 109 294
May 10, 2017 (DE) .......................... 10 2017 110 145

(51) Int. Cl.
*G07C 9/00* (2006.01)
*H01Q 1/32* (2006.01)
(Continued)

(52) U.S. Cl.
CPC .......... *B60R 25/245* (2013.01); *B60R 25/31* (2013.01); *E05B 81/78* (2013.01); *E05B 85/00* (2013.01);
(Continued)

(58) Field of Classification Search
CPC ............ G07C 9/00309; G07C 9/00182; G07C 9/00007; G07C 2009/00793;
(Continued)

(56) References Cited

U.S. PATENT DOCUMENTS 6,577,228 B1 * 6/2003 Tsuchida ................. B60R 25/24
340/10.1
7,199,317 B2 * 4/2007 Ieda ........................ E05B 81/78
200/600
(Continued)

FOREIGN PATENT DOCUMENTS

DE 10 2015 100 074 A1 3/2016
EP 1 083 280 A2 3/2001
(Continued)

OTHER PUBLICATIONS

European Search Report of parallel EP Application No. 18154531 dated Aug. 31, 2018, 11 pages.

*Primary Examiner* — Mark S Blouin

(74) *Attorney, Agent, or Firm* — Fay Sharpe LLP

(57) ABSTRACT

A vehicle door handle for use on a motor vehicle includes a handle and a handle support, the handle being mounted in the handle support, the handle is configured in the form of an elongated body, with a first end section, a second end section and a gripping section. Bearing sections project into the handle support and are supported there. In a cavity of the handle, an antenna for UWB signal transmission is arranged and coupled with a control circuit. In a further development of the invention, it is coupled with a proximity sensor. An authentication system and the use of an inventive vehicle door handle in an authentication system is also disclosed.

18 Claims, 4 Drawing Sheets

(51) Int. Cl.
*B60R 25/24* (2013.01)
*B60R 25/31* (2013.01)
*E05B 81/78* (2014.01)
*E05B 85/00* (2014.01)
*E05B 85/16* (2014.01)

(52) U.S. Cl.
CPC .......... *E05B 85/16* (2013.01); *G07C 9/00031* (2013.01); *G07C 9/00111* (2013.01); *G07C 9/00309* (2013.01); *H01Q 1/3241* (2013.01); *G07C 2009/00373* (2013.01); *G07C 2009/00555* (2013.01); *G07C 2009/00793* (2013.01); *G07C 2209/61* (2013.01); *G07C 2209/64* (2013.01); *G07C 2209/65* (2013.01); *H01Q 1/3283* (2013.01)

(58) Field of Classification Search
CPC ...... G07C 9/00111; G07C 2009/00769; G07C 2009/00928; G07C 9/00944
USPC .......................................................... 340/5.64
See application file for complete search history.

(56) References Cited

U.S. PATENT DOCUMENTS

| | | | |
|---|---|---|---|
| 7,422,258 B2* | 9/2008 | Schindler .......... | B29C 45/14639 296/1.02 |
| 7,548,210 B2* | 6/2009 | Hashiguchi ............. | E05B 81/78 343/713 |
| 7,598,469 B2* | 10/2009 | Tanimoto ................ | B60R 25/00 200/341 |
| 7,679,571 B2* | 3/2010 | Inaba .................... | B60R 25/246 343/713 |
| 7,984,938 B2* | 7/2011 | Tanimoto ................ | E05B 81/78 292/336.3 |
| 8,757,686 B2* | 6/2014 | Ishida ..................... | E05B 85/14 292/336.3 |
| 9,164,125 B2* | 10/2015 | Tsurumaki ............... | E05B 81/77 |
| 9,249,606 B2* | 2/2016 | Naka ....................... | E05B 81/77 |
| 9,484,626 B2* | 11/2016 | Dykhouse ............ | H01Q 1/3241 |
| 9,616,807 B2* | 4/2017 | Miura .................. | B60Q 1/2661 |
| 9,652,916 B2* | 5/2017 | Fontanet .............. | H03K 17/962 |
| 9,710,986 B2* | 7/2017 | Tabata ................ | B60R 25/2036 |
| 9,745,778 B1* | 8/2017 | Bingle .................... | E05B 81/78 |
| 9,911,259 B1* | 3/2018 | Ghabra ................ | G07C 9/00111 |
| 2003/0001729 A1 | 1/2003 | Ieda et al. | |
| 2003/0063037 A1 | 4/2003 | March et al. | |

FOREIGN PATENT DOCUMENTS

| | | |
|---|---|---|
| EP | 1 473 426 A1 | 11/2004 |
| EP | 2 772 986 A1 | 9/2014 |
| EP | 2 800 068 A2 | 11/2014 |

* cited by examiner

VEHICLE DOOR HANDLE WITH ANTENNA ARRANGEMENT

BACKGROUND

The invention relates to a vehicle door handle with an aerial arrangement.

In particular, the invention relates to a vehicle door handle for use on a motor vehicle, the vehicle door handle having a handle and a handle support. The handle is mounted in the handle support. Such a vehicle door handle assembly is attached to a vehicle door by placing the handle support on the inside of a door panel, i.e., the side facing the passenger compartment, while the handle is arranged on the outside of the door panel to be operated by the user. In this way, the door panel is situated between the handle and the handle support. Attachments on the handle protrude through openings in the door panel and are coupled with the handle support.

The handle is configured in the form of an elongated body, with bearing sections formed in the longitudinal direction of the handle at both end sections. Depending on the design of the door handle as a fixed door handle or as a hinged door handle, the bearing sections are coupled with the handle support either in a fixed or in a movable manner.

In a middle section of the handle, a gripper section is configured to be grabbed by a user.

With a fixed door handle, the bearing sections are firmly coupled with the handle support. This coupling is carried out during initial installation and the door handle interacts with an electrically operated lock (e-latch). The handle is then used especially as a means of access to swing the door and, if necessary, accommodates electronic sensors and other components that trigger the electric door lock when a user grabs the handle.

However, with a pivoting door handle one end section of the handle is configured in the form of an actuating section with associated bearing section. In a second end section along the longitudinal alignment of the handle of the pivoting door handle, a pivoting section with associated bearing section is formed. The pivoting section and the actuating section are arranged at the longitudinal ends of the handle facing away from each other.

In this application, the actuating section of a pivoting handle is referred to as such because its bearing section projects into the handle support and is in mechanical operative connection with actuating means to transmit a movement of the handle to the actuating means. This section can be moved when a user grabs or reaches behind the gripping section and exerts a pulling force. Then the actuating section is deflected, and the associated bearing section actuates the actuating means in the handle support.

At the other end of the handle of the pivoting door handle, the pivoting section is formed. The bearing section of this pivoting section is accommodated in a pivot bearing of the handle support, so that the handle can be pivoted in a guided movement by interaction of the bearing section of the pivoting section and the pivot bearing when the user pulls in the gripping section. Thus, the handle is pivoted on one side in a pivot bearing and consequently deflected at the other end distal to the pivoting section (the actuating section), to actuate the actuating means in the handle support.

Irrespective of the type of door handle, i.e., both fixed door handles and pivoting door handles, at least one antenna with a control circuit is arranged in the handle, the control circuit having signal lines, which are guided through the handle to the handle support. Electromagnetic signals can be emitted via the antenna in the handle.

Vehicle door handles of the type mentioned above are known in the field of technology. For example, a vehicle door handle device is disclosed in EP 2 772 986 A1.

In many cases, the antennas located in the vehicle door handle are often low-frequency antennas that transmit trigger or alarm signals to electronic vehicle keys for so-called keyless entry systems. However, there is an increasing need for more complex communication in motor vehicles.

The invention has the objective of providing an improved functionality of a vehicle door handle.

BRIEF SUMMARY

This objective is achieved by a vehicle door handle having the characteristics of claim 1, using the characteristics of claim 15, and with an authentication system having the characteristics of claim 16.

According to the invention, the vehicle door handle of the type mentioned at the beginning has an ultra-wideband antenna inside the handle, which is configured for ultra-wideband signal transmission. In this context, ultra-wideband is also used in abbreviated form as UWB, Ultra-Wide-Band. Preferably, the control circuit is configured in the form of a transceiver circuit for bidirectional operation, i.e., transmission and reception operation with the same UWB antenna. UWB communication is possible via the assembly of antenna and control circuit.

In principle, the use of UWB radio signals for different applications is known from prior art. However, market-ready UWB transceivers have only recently become available for use in products for end users.

The basic principles of ultra-wideband technology have been known for a long time. However, it has only recently become accessible for use outside special applications, not least due to more liberal regulation.

Ultra-wideband technology involves a short-range radio communication based on the emission of short signal pulses, which covers a large number of frequencies within a large frequency bandwidth. In particular, the width of the frequency ranges covered depends on the regulatory requirements of the corresponding territorial area. With UWB, information transmission is not based on carrier frequency modulation. Instead, other modulation methods are used, such as on/off keying, pulse amplitude modulation and pulse position modulation.

In relation to established LF and/or HF communication, UWB communication presents the disadvantage of the comparatively high energy required by many transceivers currently available and suitable for UWB communication.

However, UWB communication has the basic advantage that due to the transmission of pulses, it is possible to determine a distance using a runtime-based approach, which is often referred to as the time-of-flight method. For example, the distance between the UWB antenna and a portable ID transmitter prepared for UWB communication can be determined by emitting a UWB signal from the UWB antenna to the portable ID transmitter, a UWB transceiver of the portable ID transmitter responds thereto and a control means coupled to the UWB antenna of the handle evaluates the detected response signal. This is done by evaluating the time elapsed between transmission and reception. In this example, the distance to the ID transmitter, the processing time within the ID transmitter, and the distance from the ID transmitter to the UWB antenna are taken into account. If, as in this example, the running time is evaluated on the vehicle, only the processing time must be stored on the vehicle within the ID sensor, so that a corresponding correction of the time measured on the vehicle can be made between transmission of the UWB signal and reception of the UWB response.

Experience has shown that the accuracy of such a UWB-based distance determination is significantly higher in usually provided magnitudes of distances than it is when other methods are used. Generally, UWB-based distance determination is more accurate than distance determination based on signal strength determination of LF signals or triangulation of LF signals. Under good conditions, the accuracy of UWB-based distance determinations is in the range of 10 to 20 cm.

Because of the fact that the pure running time of the UWB signal is relatively short compared to the processing time, additional processing of the signal, for example, for manipulation of the signal in the context of a relay station attack, would be detectable due to the unexpectedly long total time between transmission of a UWB signal and receipt of the corresponding response. Therefore, a compromise, for example, by a relay station attack, is, if at all, only possible with UWB-based distance determination with very complex methods.

Another advantage, which results from using UWB signals, involves that due to the large number of frequencies used, shading of the signals is very unlikely. This can be attributed to the fact that for at least some of the frequencies used simultaneously there is a high probability that there is always a line of sight between the transmitter and receiver. One reason for this is that due to the high number of different frequencies used, diffraction effects and/or reflections can always be expected for some frequencies.

As already mentioned at the beginning, according to the invention, the UWB antenna is arranged inside the handle.

By placing the UWB antenna inside the handle, a solution is provided to elegantly place the UWB antenna on the vehicle outside its metal casing. Arranging the UWB antenna outside the metal casing of the vehicle results in improved UWB communication. This is expressed in the fact that any interference of the UWB signal between the ID transmitter and the UWB antenna of the vehicle and/or between the UWB antenna of the vehicle and the ID transmitter is significantly reduced. Because UWB communication is based on transmitting and receiving signals with many frequencies in a comparatively wide frequency spectrum, at some frequencies the metal casing would cause only a slight interference of the signals, while other frequencies would be severely affected, in particular attenuated. The proposed invention significantly reduces, if not completely avoids, the frequency-dependent interference of the UWB signals associated with the use of many frequencies.

Moreover, arranging the UWB antenna within a vehicle door handle has the additional advantage that the electronics usually present in a current vehicle door handle can be partly or completely used or adapted to at least contribute to controlling the UWB antenna. Furthermore, it is possible to provide the UWB antenna together with other electronics, for example, with an existing LF interface or capacitive and/or inductive electronics as a common module for a vehicle door handle or within the handle of a vehicle door handle.

Preferably, it is provided that the UWB antenna and the control circuit are part of a UWB interface. In a special further development, it can be arranged that the UWB interface is provided in the form of a UWB transceiver, which is positioned in the inner cavity of the handle.

According to this further development, the UWB antenna with the associated transceiver circuit and, if necessary, further peripheral circuits are arranged within the handle.

The arrangement of the UWB antenna on a vehicle door handle or within a vehicle door handle is accompanied by the additional advantage that an operator seeking access to a vehicle usually moves towards the vehicle door handle. This has a positive effect on radio communication between the ID transmitter, which is in the possession of the operator, and the UWB interface to the extent that interferences, for example by shading objects, are very unlikely.

As described above, the handle of each door handle, whether pivoted or fixed, has two end sections, each with associated bearing sections. The gripping section is arranged between them. The gripping section is defined by the fact that it can be accessed and operated by a user. The gripping section involves the section that is available for grabbing or reaching behind. In particular, this is the case when there is sufficient clearance between handle and door panel (or handle support), because at least 3 cm distance between handle and door panel is required for comfortably reaching behind. Accordingly, the gripping section has a distance to the handle support, which provides space for the hand or fingers of a user. On the other hand, it is not possible to reach behind the end sections. They extend close to the metal casing of the vehicle or the underlying handle support and are even coupled with the handle support without spacing in the area of the bearing sections. Thus, according to a further development of the invention, the UWB antenna is accommodated in the end sections, outside the gripping section. Where exactly the transition between end sections and gripping section extends is determined by the respective design of the door handle. However, according to this application, an end section ends where a user can grab and operate the handle.

A further development of the invention is based on the realization that the shielding of the UWB antenna field by the hand or other body parts of a user causes interferences. Therefore, the antenna is preferably arranged outside the gripping section of the handle. In this section, it is least likely that the hand of a user grabbing the gripping section would interfere with the UWB antenna field.

Arranged in this area, the transmitting and receiving antennas can be operated without risking that the exposure to a user's body tissue would greatly interfere with the antennas. The shading of the signals already reduced by using UWB technology is even more avoided through the positioning of the UWB antenna used in the further development. The antenna can be fully accommodated in an end section outside the gripping section. In this way, at least most of the antenna is located outside the gripping section.

To optimize the quality of signal emission and signal reception, it is preferred that the vehicle door handle is configured at least in certain areas with one or more non-metallic materials in such a way that a signal path without metallic shielding is available between the antenna and the external surroundings. In particular, it can be provided that a door handle casing comprises at least partly a non-metallic material, for example, a plastic material. In an embodiment, in which the antenna is arranged in an end section of the handle, the casing of this end section can consist partly, preferably completely, of a non-metallic material.

The antenna can be completely configured outside the gripping section and inside an end section in the part of the handle located outside the door panel. However, it can also be configured, at least partially, in the part of the handle protruding through the opening in the door panel, i.e., in the bearing sections of the end sections. According to the above description, the handle has bearing sections that protrude through the door panel. Accordingly, there is no door panel in this area and the antenna arrangement can be accommodated in a bearing section of the end sections.

In a preferred embodiment of the invention, the door handle is configured with a pivoting handle according to the above description and the antenna is mounted in the pivoting section of the handle. As described above, in door handles with pivoting handles, the handle comprises as sections along its longitudinal direction at least one actuating section, one gripping section, and one pivoting section. Mechanical actuation and force transmission into actuating means in the handle support take place at the actuating section by means of force transmission of a pulling action of a user in the area of the gripping section.

In the pivoting section, an overlap by the hand of a user grabbing the gripping section is most unlikely. Vehicle door handles with pivoting handles are usually configured in such a way that the gripping section is aligned closer to the actuating section than to the pivoting section so as to improve the leverage effect and ease of movement. Therefore, a user grabbing the gripping section in the comfortable area will place his hand closer to the actuating section than to the pivoting section. This applies in general and is largely independent of the concrete design of a door handle. To optimize power transmission, it is important that the user is grabbing as far away from the rotation axis as possible and as close as possible to the actuating section.

In most door handles, the transitions between the pivoting section and the gripping section are continuous. However, it is essential for the further development of the invention that the antenna is at least largely accommodated in the pivoting section. In any case, the antenna is mounted in the portion of the handle to which the pivoting section forms the end section.

In a preferred embodiment of the invention, the antenna is configured for UWB signal transmission at a frequency in the frequency range between 30 MHz and 10.6 GHz, preferably between 2.0 GHz and 8 GHz. The corresponding adaptation of the control circuit is a preferred component of the invention. The concrete choice of subranges of the mentioned frequency ranges depends on the countries in which the inventive door handle is used, and which frequency ranges are released for UWB communication in these countries.

It is particularly preferred that the antenna is arranged as a conductor track on a circuit board. The vehicle door handle can contain other electronic components, which may be located on the same board. However, it is essential that a board section together with the antenna is arranged in the pivoting section of the door handle. The antenna can also be arranged together with the control circuit on a common board, in which case it is essential that the board is aligned and arranged in the handle in such a way that the antenna is arranged at an end of the board facing away from the gripping section so that there is maximum distance from the gripping section.

Preferably, the circuit board is configured in the form of a circuit board that can be bent at least in certain areas for positioning the circuit board in the vehicle door handle. This means that a circuit board can be provided which can be bent in certain areas. For example, the bending capability in certain areas can be achieved by rejuvenating the material and/or by selecting the appropriate material. Due to the bending capability in certain areas, the circuit board can be inserted into the vehicle door handle with a certain flexibility and can therefore be used to a certain extent for differently shaped handles.

It is particularly preferred if the pivoting section is configured as an extension of the gripping section of the handle and the pivoting section is formed by a section of the handle, which has a length of less than 30% of the total length, preferably less than 20% of the total length of the handle.

Thus, the pivoting section represents a maximum of 30% of the length of the handle and is defined as an area, which is not grabbed at all by a user in normal operation. Usually, the area in this section between the door panel and the handle is so small that it is impossible for a user to reach behind it.

It is particularly preferred that the vehicle door handle is configured in such a way that the distance between handle and handle support is greater in the entire gripping section than in the actuating section and in the pivoting section.

Thus, the gripping section is defined as the middle section of the handle, which has in each area a greater distance to the handle support than the end sections. Preferably, the gripping section is defined in such a way that the distance between handle support and handle is at least 3 cm. The remaining sections of the handle then form the actuating section on one side and the pivoting section on the other side.

According to one idea of the invention, it is provided that a vehicle door handle as described above is used in a vehicle authentication system to authenticate a portable ID transmitter to the vehicle. This has the purpose of enabling vehicle functions for an operator who carries the portable ID transmitter. The authentication system comprises the portable ID transmitter and a vehicle authentication arrangement. The portable ID transmitter has at least one first ID transmitter UWB interface and the authentication arrangement has at least one UWB antenna of a first vehicle UWB interface. The first ID transmitter UWB interface and the first vehicle UWB interface are arranged for UWB communication with each other.

A further idea of the invention relates to an authentication system of a vehicle for authenticating a portable ID transmitter to the vehicle to release vehicle functions for an operator carrying the portable ID transmitter. The authentication system comprises the portable ID transmitter and a vehicle authentication arrangement. The portable ID transmitter has at least one first ID transmitter UWB interface and the authentication arrangement has at least one first vehicle UWB interface with a UWB antenna, at least the UWB antenna being arranged within a handle of a vehicle door handle. The first ID transmitter UWB interface and the first vehicle UWB interface are arranged for UWB communication with each other. In particular, according to one of the embodiments described above the use of a vehicle door handle is provided as part of the authentication system.

The term UWB interface refers to an arrangement of elements, which fulfils the requirements for UWB communication with another device arranged for UWB communication. For example, a UWB interface can involve a UWB transceiver of the type that has been available for industrial applications for some time.

Thus, a system is proposed, which has a UWB antenna arranged in a vehicle door handle as part of a UWB interface of the vehicle and at least one ID transmitter adapted to this vehicle UWB interface. Due to the advantages of UWB communication described in connection with the inventive vehicle door handle, such a system is able to determine a distance of the ID transmitter with good accuracy and thereby guarantee a high level of security against compromising the distance determination.

In an advantageous embodiment of the authentication system, the first vehicle UWB interface is coupled with a proximity sensor located inside the vehicle door handle. The first vehicle UWB interface and the proximity sensor are coupled to a first control means. The control means is arranged to control the first vehicle UWB interface and set it to a communication-ready mode after the first proximity sensor has detected an approach by an operator and has notified the operator of the approach by outputting an approximation signal to the control unit.

For example, to technically control the UWB antenna, the first vehicle UWB interface and the UWB antenna may be configured in the form of a UWB transceiver, which most of the time is not ready for transmission and reception. The first control means is arranged to control the UWB transceiver so that the UWB antenna of the UWB transceiver is set to a state ready for reception and/or transmission. Therefore, the first vehicle UWB interface is set to communication-ready mode, depending on whether the proximity sensor has detected an approach by the operator. This functional coupling of the proximity sensor with the readiness to transmit and/or receive of the first vehicle PWM interface reduces the period of energy-intensive operation of the first vehicle PWM interface to situations in which the functionality is probably actually required.

For example, the control means can involve a control unit on the vehicle or the control circuit for transmission and reception operation described at the beginning, which is arranged within the handle.

For example, the first proximity sensor can involve an NFC sensor, a capacitive sensor, or an inductive switch. Optical sensors, such as time-of-flight cameras, can also be provided. In particular, the capacitive sensor and the inductive sensor have the advantage that they are provided with many currently available vehicle door handles, making it possible to use existing development results and experience. The provision of an NFC sensor, in particular an NFC transceiver, is accompanied by the advantage that the NFC functionality can be used to contribute to improving the authorization check, for example, in connection with a specifically provided NFC chip, which the operator carries with him, and in particular with an NFC chip, which is part of the ID transmitter. It is also possible to provide a combination of NFC sensor, capacitive sensor, optical sensor, and/or inductive switch.

BRIEF DESCRIPTION OF THE DRAWING

Subsequently, the invention is described in more detail by using the enclosed figures.

DETAILED DESCRIPTION

Figure 1A:
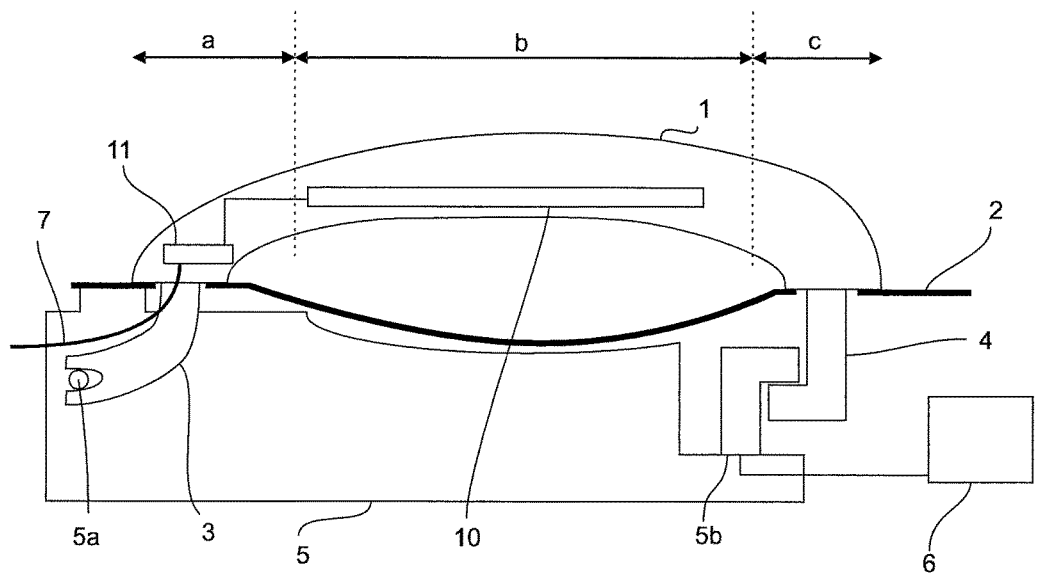
FIG. 1a schematically shows a first embodiment of the invention in a rest position.

FIG. 1a shows a handle 1 of a motor vehicle door handle. This embodiment involves a vehicle door handle with pivoting handle. In the mounted condition shown, the handle 1 is in contact with a vehicle door panel 2. A bearing section 3 configured in the form of a pivoting attachment and a bearing section 4 configured in the form of an actuating attachment extend through the door panel to the inside of the door. On the inside of the door, the handle carrier 5 is arranged, of which the pivot bearing 5a and the actuating means 5b are shown here. The actuating means 5b are in an electrical or mechanical operative connection with a locking device 6, which causes the door to unlock.

In FIG. 1a, handle is divided into sections a, b and c. Section b represents the gripping section that a user can access to operate the handle. Section c represents the actuating section, which is firmly connected with the actuating attachment 4. This section c introduces the forces, which are exerted on the handle in the area of the gripping section b, into the actuating means 5b.

Section a is the pivoting section. Part of the pivoting section a is configured in the form of a pivoting attachment 3. The pivoting attachment 3 is guided through an opening in the door panel 2 and rests in the bearing 5a of the handle support. The entire handle can be rotated about a rotation axis, with this axis running through the bearing 5a. During such a pivoting movement, section c of the handle and the actuating attachment 4 are deflected.

Inside the handle 1, a control circuit 10 is arranged, which is coupled with a UWB antenna 11 for bidirectional communication. The antenna 11 and the control circuit 10 form a transceiver for UWB communication. A wiring harness 7 with supply voltage and signal lines is led from the handle 1 in the area of the pivot bearing 5a to the handle support 5. In this embodiment, the antenna 11 forms its own module, separate from the control circuit 10. However, depending on the design of the handle, it is also possible to integrate the control circuit 10 together with the antenna 11 on one circuit board or to provide multiple electronic modules, one of which is a module with the UWB antenna and is arranged in the pivoting range (for example, in addition it is possible to provide low-frequency antennas or sensor arrangements). Depending on the design, it can also be provided that the antenna is configured in the form of an equipped antenna.

It is shown that the UWB antenna 11 is completely accommodated in the pivoting section a of handle 1. In this area, it is unlikely that a user will interfere or change his grip, which results in an improvement of the effectiveness of the transmission-reception communication.

Figure 1B:
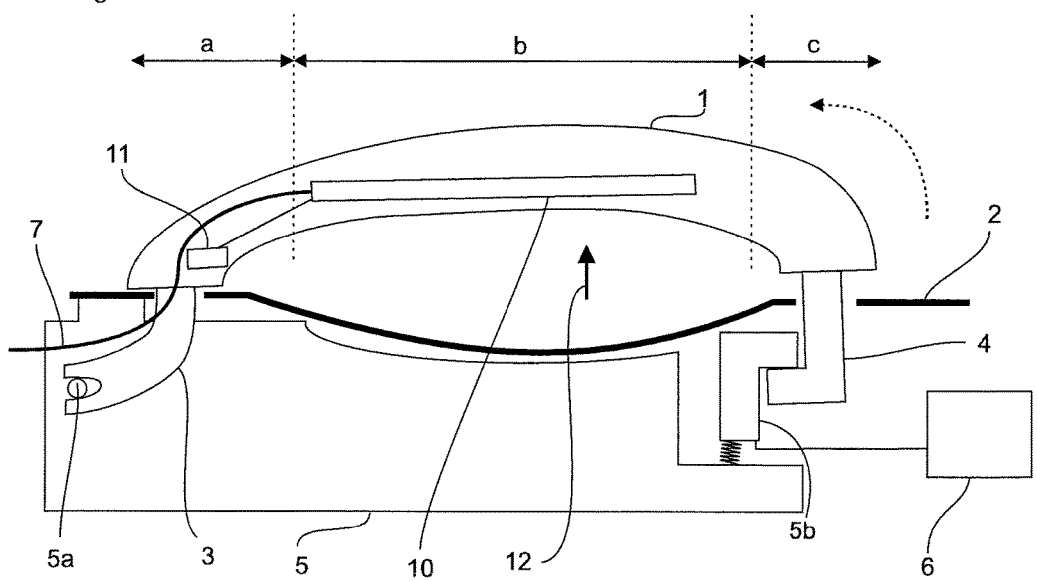
FIG. 1b shows the embodiment depicted in FIG. 1a in an operating position.

FIG. 1b shows an actuation situation in which the handle 1 is pivoted about an axis through the pivot bearing 5a, which is caused by the action of a force in the direction of the arrow 12. The actuating means 5b are deflected by the actuating attachment 4, and this deflection is transmitted to the locking device 6. It is obvious that the lever forces alone will cause the user, at least after a certain familiarity with the door handle arrangement, to regularly select a contact point on the handle, which is closer to the actuating section c than to the pivoting section a. This facilitates the operation by reducing the required forces. The antenna 11 is then located at the point of least interference in the handle, because there is an extremely low risk for the user to change his grip.

As described above, the arrangements and orientations of the antenna in the pivoting section can be manifold. In the example shown, it would also be possible to partially immerse the antenna in the pivoting attachment 3a. In addition, it is possible to completely accommodate the control device in the pivoting attachment a, for example, when a circuit board is inserted into the pivoting section a both with antenna and control device mounted in a compact manner.

Figure 2A:
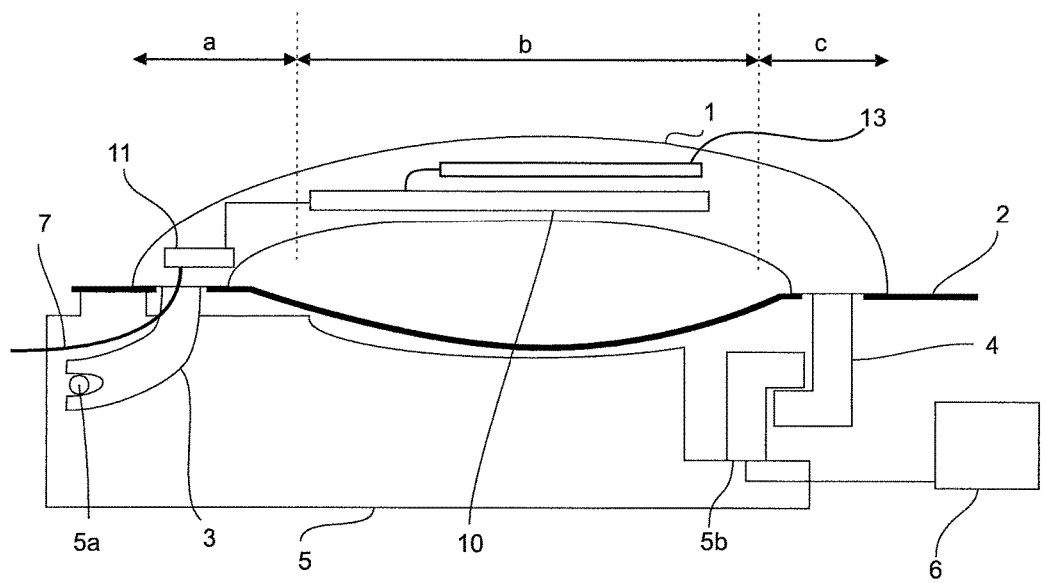
FIG. 2a schematically shows a second embodiment of the invention in a rest position.
Figure 2B:
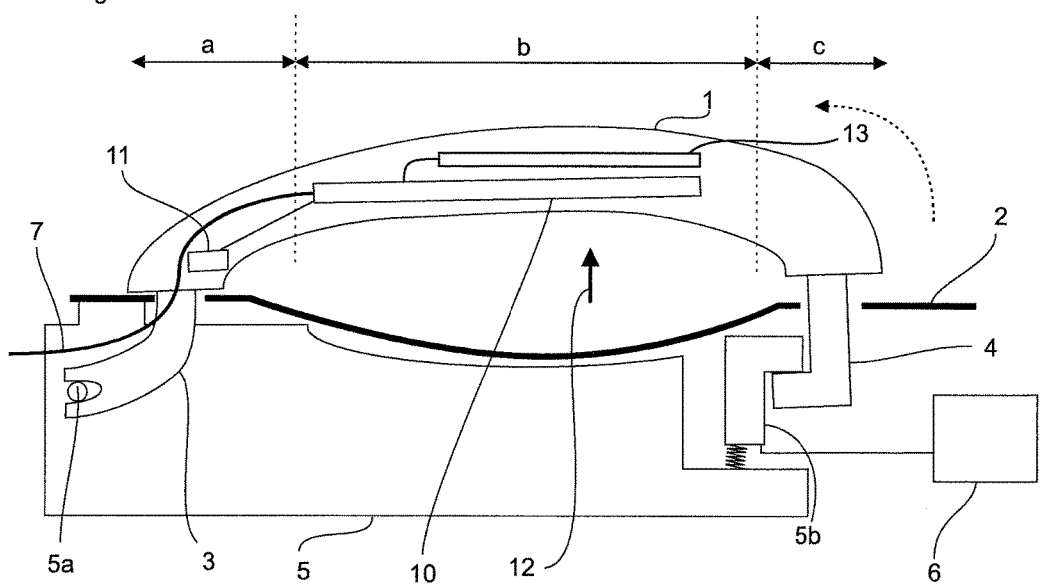
FIG. 2b shows the embodiment depicted in FIG. 2a in an operating position.

FIGS. 2a and 2b show another embodiment of a vehicle door handle. This differs from the embodiments shown in FIGS. 1a and 1b in particular by the proximity sensor 13, which is configured in the form of a capacitive proximity switch in the embodiment shown, and which is connected with the control circuit 10.

Figure 3:
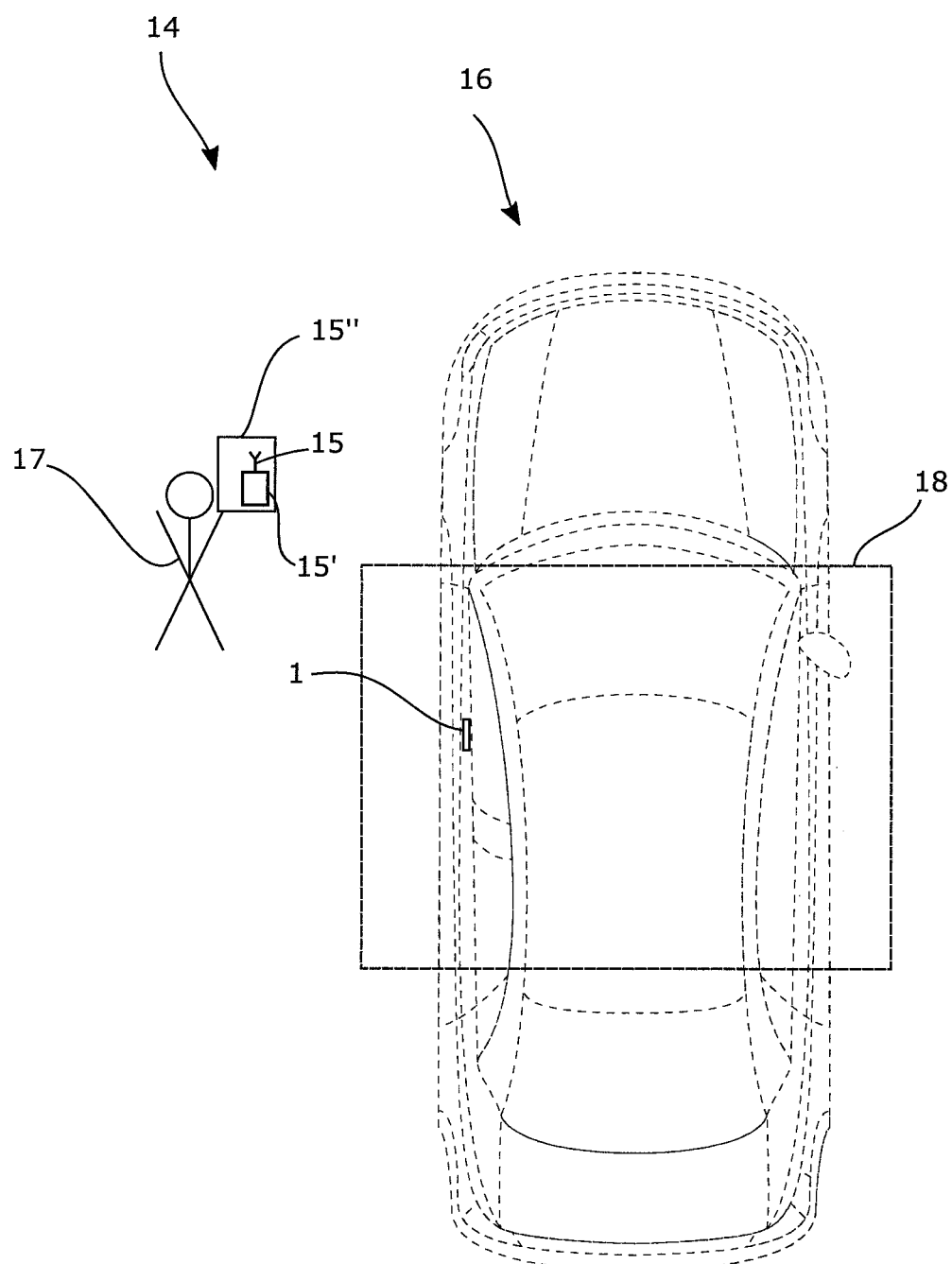
FIG. 3 shows a schematic version of the authentication system.

FIG. 3 shows an embodiment of an inventive authentication system 14.

The authentication system 14 is used to authenticate a 15" ID transmitter for a vehicle 16. FIG. 1 shows a situation in which the 15" ID transmitter is in the possession of an operator 17. With the inventive authentication system 14, it is possible to perform the authentication of the portable ID transmitter 15" for the vehicle 16, so that the operator 17, who carries the portable ID transmitter, can access vehicle functions, for example, starting the vehicle 16 or opening one or more of the available vehicle doors.

In addition to the portable 15" ID transmitter, which has an ID transmitter UWB interface 15 comprising a UWB antenna 15 on the side of the ID transmitter, the authentication system 14 has a vehicle authentication arrangement 18. The authentication arrangement 18 has at least a first vehicle UWB interface. In the embodiment shown, the first vehicle UWB interface with a UWB antenna as part of a UWB transceiver is arranged within handle 1 of the vehicle door handle.

Furthermore, the authentication arrangement has an LF interface with at least one first LF antenna (not shown) and a proximity sensor configured in the form of a capacitive sensor, which is also arranged inside the door handle in the embodiments shown in FIGS. 2a and 2b. However, in other embodiments, it may not be available or may be arranged at a different position. In the embodiment shown in FIG. 3, the UWB transceiver, the LF interface, and the proximity sensor are coupled with a control means on the vehicle (not shown). The control means is capable of controlling and monitoring the individual components of the authentication arrangement 18 as control means of the authentication arrangement 18 to perform a complete or partial authentication operation.

Figure 4:
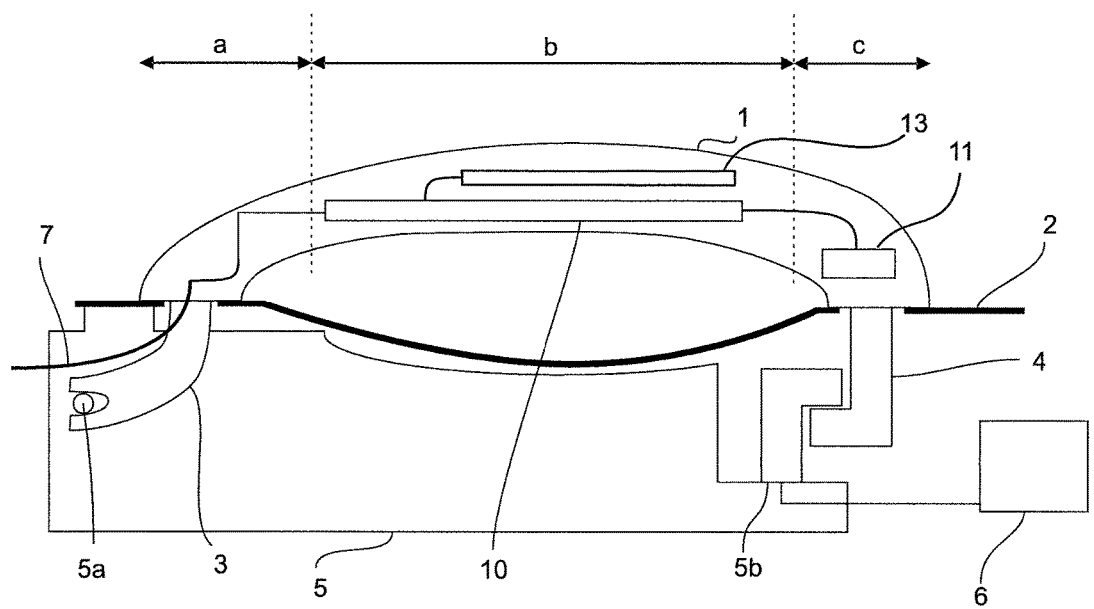
FIG. 4 schematically shows a third embodiment of the invention in a rest position.

The embodiment of an inventive vehicle door handle shown in FIG. 4 differs from the embodiment shown in FIG. 2a by the position of the antenna. In the embodiment shown, the antenna is not located in the first end section, but in the second end section. The corresponding positioning of the antenna can also be provided as an alternative positioning of the antenna to modify the embodiment of FIG. 1 or any one of the other advantageous further developments of the inventive vehicle door handle.

The invention claimed is:

1. A vehicle door handle for use on a motor vehicle, the vehicle door handle including a handle and a handle support, the handle being mounted in the handle support,
    the handle being configured in the form of an elongated body, with a first end section and a second end section and a gripping section, the gripping section being located between the first and second end sections in a middle section of the handle, with the first end section and the second end section each having bearing sections,
    wherein the bearing sections of the handle first end section and the handle second end section project into the handle support and are supported there,
    an antenna arranged in an inner cavity of the handle,
    wherein the antenna is configured in the form of a UWB antenna for a UWB signal transmission in a UWB frequency range and wherein a control circuit for a transmission and reception operation is coupled with the antenna, and
    wherein a capacitive or inductive proximity sensor is arranged in the inner cavity of the handle, and wherein the control circuit and the proximity sensor are coupled to each other, and wherein the control circuit is arranged to control the antenna and to set it into a communication-ready mode after the proximity sensor has detected an approach by an operator.

2. A vehicle door handle according to claim 1, wherein the control circuit is arranged in the inner cavity and has signal lines, which are guided to the handle support.

3. A vehicle door handle according to claim 1, wherein the vehicle door handle is configured at least in certain areas with one or more non-metallic materials in such a way that a signal path without metallic shielding is available between the UWB antenna and the external surroundings.

4. A vehicle door handle according to claim 1, wherein the antenna is accommodated outside the gripping section in one of the first and second end sections of the handle.

5. A vehicle door handle according to claim 4, wherein an enclosure of the end section accommodating the antenna consists at least partly of one or more non-metallic materials.

6. A vehicle door handle according to claim 4, wherein the handle is supported in movable fashion in the handle support,
    the first end portion of the handle being formed as an actuating portion and the second end portion being formed as a pivot portion in such a way that the pivot portion and actuating portion are arranged at opposite ends of the handle,
    the bearing section of the actuating section projecting into the handle carrier and being in mechanical operative connection there with actuating means to transmit movement of the handle to the actuating means,
    the bearing section of the pivoting section being accommodated in a pivot bearing of the handle support so that the handle in the pivot bearing can be pivoted in a movement guided by the bearing section and the pivot bearing,
    the antenna being accommodated in the pivoting section of the handle.

7. A vehicle door handle according to claim 1, wherein the antenna is configured for a UWB signal transmission in a UWB frequency band from the frequency range between 30 MHz and 10.6 GHz.

8. A vehicle door handle according to claim 7, wherein the UWB frequency band is in the range between 2.0 GHz and 8 GHz.

9. A vehicle door handle according to claim 1, wherein the antenna is configured in the form of a conductor track on a circuit board.

10. A vehicle door handle according to claim 9, wherein the antenna is arranged together with the control circuit on a common board.

11. A vehicle door handle according to claim 10, wherein the circuit board is configured in the form of a circuit board that can be bent at least in certain areas for positioning the circuit board in the vehicle door handle.

12. A vehicle door handle according to claim 1, wherein the antenna is configured in the form of a separate component spaced from the control circuit and/or the antenna is configured in the form of an equipped antenna.

13. A vehicle door handle according to claim 1, wherein the end sections are configured in the form of integral extensions of the gripping section, wherein each end section is formed by a section of the handle, which has a length of less than 30 percent of the total length of the handle.

14. A vehicle door handle according to claim 13, wherein each end section has a length of less than 20% of the total length of the handle.

15. A vehicle door handle according to claim 1, wherein a distance between the handle and the handle support is greater in the entire gripping section than in the first and second end sections.

16. Use of a vehicle door handle in an authentication system of a vehicle for authenticating a portable ID transmitter to the vehicle to enable vehicle functions for an operator carrying the portable ID transmitter,
wherein the vehicle door handle comprises a handle and a handle support, the handle being mounted in the handle support and being configured in the form of an elongated body, with a first end section, a second end section and a gripping section which is located between the first and second end sections in a middle section of the handle, wherein the first end section and the second end section each include bearing sections,
wherein the bearing sections of the handle first and second end sections project into the handle support are supported there,
an antenna arranged in an inner cavity of the handle, wherein the antenna is configured in the form of a UWB antenna for a UWB signal transmission in a UWB frequency range,
a control circuit for a transmission and reception operation which is coupled with the UWB antenna,
wherein the authentication system comprises the portable ID transmitter and an authentication arrangement on the side of the vehicle, the portable ID transmitter comprising at least one first ID transmitter UWB interface and the authentication arrangement comprising the UWB antenna which is part of a first vehicle UWB interface, and wherein the first ID transmitter UWB interface and the first vehicle UWB interface are arranged for UWB communication with each other.

17. An authentication system for a vehicle for authenticating a portable ID transmitter to the vehicle to enable vehicle functions for an operator carrying the portable ID transmitter, comprising:
a vehicle door handle including a handle and a handle support, the handle being mounted in the handle support and being configured in the form of an elongated body, with a first end section, a second end section and a gripping section which is located between the first and second end sections in the middle section of the handle, wherein the first end section and the second end section each include bearing sections,
wherein the bearing sections of the handle first and second end sections project into the handle support and are supported there,
an antenna arranged in an inner cavity of the handle, wherein the antenna is configured in the form of a UWB antenna for a UWB signal transmission in a UWB frequency range,
a control circuit for a transmission and reception operation which is coupled with the UWB antenna,
the authentication system comprising the portable ID transmitter and an authentication arrangement on the side of the vehicle, the portable ID transmitter comprising at least one first ID transmitter UWB interface and the authentication arrangement comprising a first vehicle UWB interface, including the UWB antenna arranged within the vehicle door handle, and wherein the first ID transmitter UWB interface and the first vehicle UWB interface are arranged for communication with each other.

18. An authentication system according to claim 17, wherein the first vehicle UWB interface is coupled with a proximity sensor arranged within the handle of the vehicle door handle, wherein the first vehicle UWB interface and the proximity sensor are coupled with a first control means, which is configured to control the first vehicle UWB interface and to set it into a communication-ready mode after the first proximity sensor has determined an approach by an operator.

* * * * *